United States Patent [19]

Hirata et al.

[11] Patent Number: 5,511,120
[45] Date of Patent: Apr. 23, 1996

[54] PORTABLE TELEPHONE SET WITH AN EARPHONE

[75] Inventors: Masaru Hirata; Satoshi Tatsumi, both of Tokyo, Japan

[73] Assignee: NEC Corporation, Tokyo, Japan

[21] Appl. No.: 228,428

[22] Filed: Apr. 15, 1994

[30] Foreign Application Priority Data

Apr. 16, 1993 [JP] Japan .................................. 5-113926
May 18, 1993 [JP] Japan .................................. 5-139407

[51] Int. Cl.⁶ ............................................. H04M 1/00
[52] U.S. Cl. ................................... 379/433; 379/434
[58] Field of Search ................................ 379/433, 434, 379/437, 438, 430, 428, 429; 455/89, 90; 242/395

[56] References Cited

U.S. PATENT DOCUMENTS

| 2,521,226 | 9/1950 | Keller | 242/395 |
| 4,646,987 | 3/1987 | Peterson | 379/438 |

FOREIGN PATENT DOCUMENTS

| 62-082824 | 4/1987 | Japan . | |
| 6417544 | 1/1989 | Japan . | |
| 165544 | 4/1989 | Japan . | |
| 1129699 | 5/1989 | Japan . | |
| 188547 | 6/1989 | Japan . | |
| 2069056 | 3/1990 | Japan . | |
| 3160851 | 7/1991 | Japan . | |
| 3258061 | 11/1991 | Japan . | |
| 3263957 | 11/1991 | Japan . | |
| 4014323 | 1/1992 | Japan . | |
| 4056530 | 2/1992 | Japan . | |
| 4-185038 | 7/1992 | Japan . | 379/430 |
| 4306942 | 10/1992 | Japan . | |

OTHER PUBLICATIONS

C. Hill; "Retractable Portable Antenna"; Motorola Technical Developments, vol. 12, Apr. 1991; p. 35.

Primary Examiner—Jeffery Hofsass
Assistant Examiner—Jack Chiang
Attorney, Agent, or Firm—Whitham, Curtis, Whitham & McGinn

[57] ABSTRACT

In a portable telephone set, an earphone cord is a flat cord. Therefore, it is difficult for the flat cord to be twisted, so that the tangling of the flat cord is avoided. The motion of the flat cord in which the flat cord is pulled out of a main body in operation and contained therein in non-operation is conveyed to an antenna, so that the antenna is extended out of the main body in operation, and the antenna is contained in the main body in non-operation. In the same manner, the motion of the antenna is conveyed to the flat cord.

8 Claims, 10 Drawing Sheets

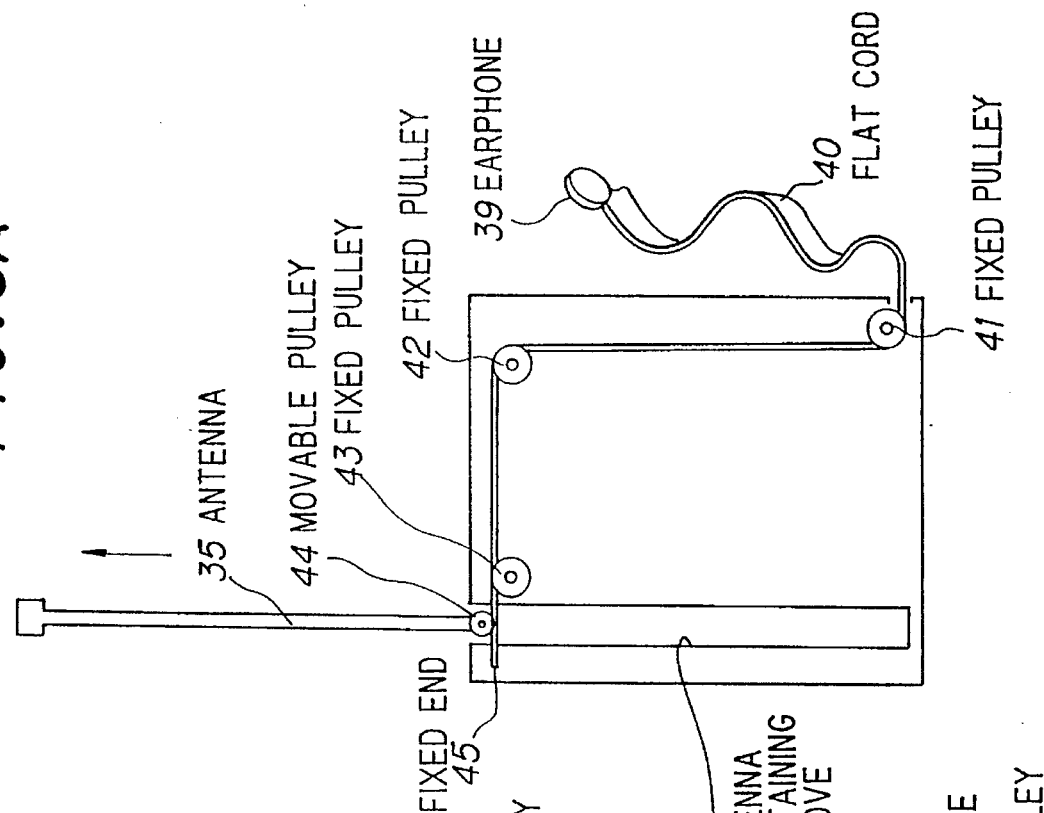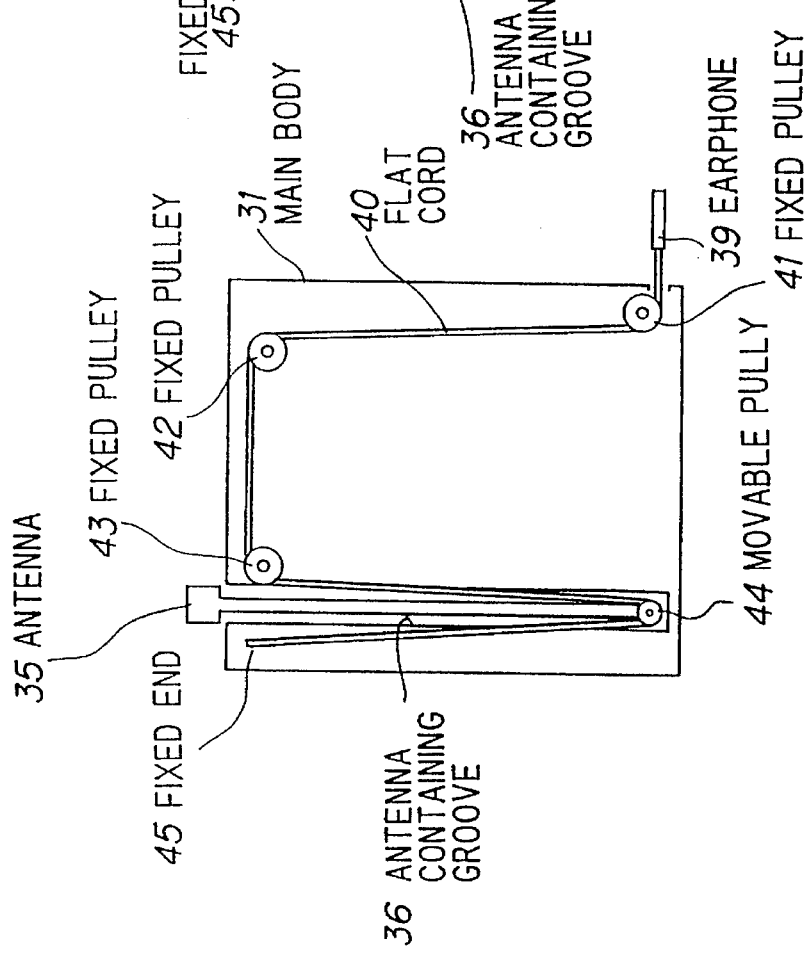

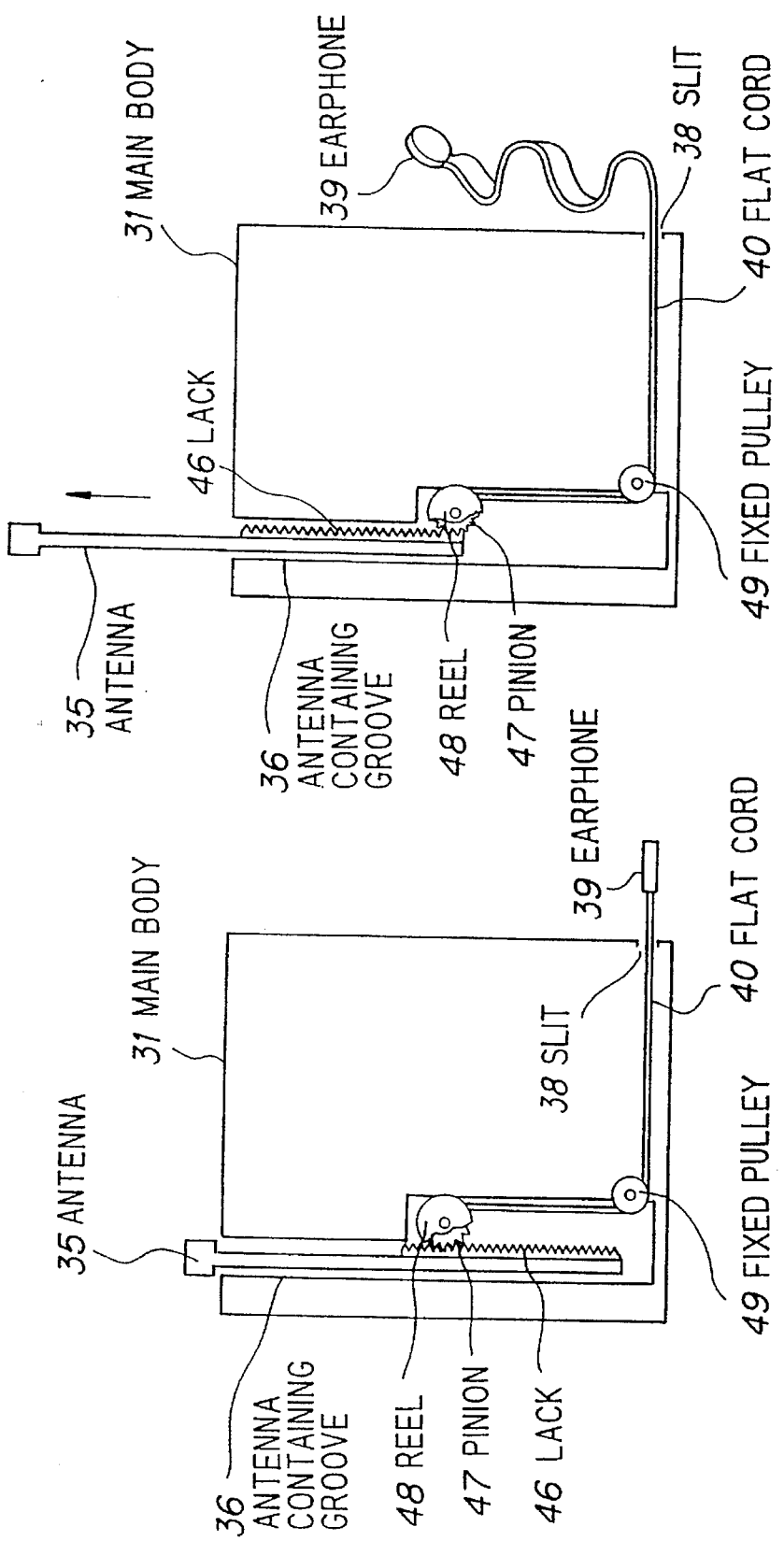

PORTABLE TELEPHONE SET WITH AN EARPHONE

FIELD OF THE INVENTION

The invention relates to a radio telephone set, and more particularly, to a portable telephone set for carrying out the radio communication by use of an earphone cord connected to a main body.

BACKGROUND OF THE INVENTION

A first conventional portable telephone set comprises a main body and a cover body, wherein the cover body is hinged to the main body, so that the main and cover bodies take the position of "close" in a non-use state and "open" in a used state. The main body is provided with a speaker, a display, and an antenna and the cover body is provided with operation keys (buttons) and a microphone.

In the used state, the cover body is opened from the main body, and the antenna is pulled out of the main body. Thus, the speaker of the main body is placed on an ear of a user, and the microphone of the cover body is positioned in the vicinity of a mouth of the user.

In the first conventional portable telephone set, however, there is a disadvantage in that the size is large. In other words, the thickness is large, when the main and cover bodies are closed in the non-used state, and the length is large, when the main body is opened by hinging the cover body in the used state.

A second conventional portable telephone set comprises a main body which is provided with a display, operation keys, an antenna a microphone, and an earphone.

In the second conventional portable telephone set, the earphone is connected to the main body by an earphone cord, so that a speaker is not necessary to be provided. Consequently, the cover body as explained in the first conventional portable telephone set can be eliminated to make the size of the portable telephone set small.

In the second conventional portable telephone set, however, there is a disadvantage in that the earphone cord is tangled to lower the manipulation thereof by a user, because the earphone cord is thin and flexible. Further, there is a disadvantage in that the earphone cord is difficult to be pulled into a cord container, if the earphone cord is tangled.

SUMMARY OF THE INVENTION

Accordingly, it is an object of the invention to provide a portable telephone set with an earphone which is small in size.

It is a further object of the invention to provide a portable telephone set with an earphone in which an earphone cord is not tangled to enhance the manipulation thereof.

It is a still further object of the invention to provide a portable telephone set, from and into a cord container of which the earphone cord is easily pulled.

According to the invention, a portable telephone set with an earphone, comprises:

a main body containing telephone communication circuit including a sound generating circuit therein and having operation keys, and a microphone thereon;

an antenna for receiving and transmitting telephone communication signals; and an earphone cord for connecting the earphone to the sound generating circuit, the earphone cord being a flat cord.

BRIEF DESCRIPTION OF THE DRAWINGS

The invention will be explained in more detail in conjunction with appended drawings, wherein:

FIGS. 8A and 8B are plan views showing operation in which an earphone cord is pulled from a container and is pulled into the container by a pulley in the fourth preferred embodiment;

FIG. 10A and 10B are plan views showing operation of containing an earphone cord in the fifth preferred embodiment.

DESCRIPTION OF THE PREFERRED EMBODIMENTS

Before explaining a portable telephone set with an earphone in the preferred embodiments according to the invention, the aforementioned conventional portable telephone sets will be explained in FIGS. 1 and 2.

Figure 1:
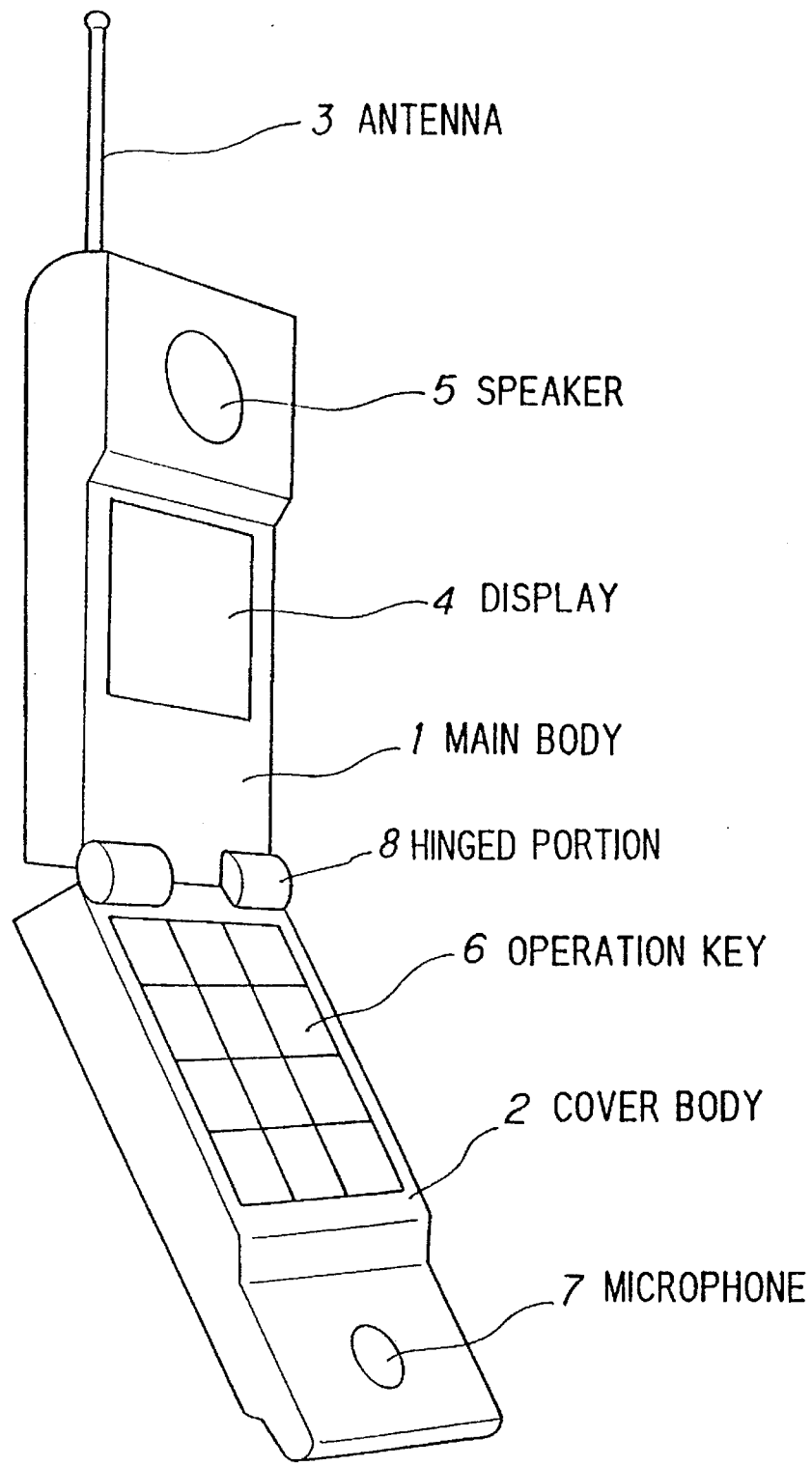
FIG. 1 is a perspective view showing a first conventional portable telephone set.

FIG. 1 shows the first conventional portable telephone set which comprises a main body 1 and a cover body 2 connected by a hinged portion 8. The main body 1 is provided with an antenna 3, a display 4, and a speaker 5, and the cover body 2 is provided with operation keys 6 and a microphone 7.

In the non-operation state, the cover body 1 is faced to be folded on the main body 1 by hinging operation of the hinged portion 8.

In the operation state, the cover body 2 is hinged off the main body 1 to take the posture as shown in FIG. 1.

In the first conventional portable telephone set, however, the size is large, especially, the thickness of the telephone set can not be reduced.

Figure 2:
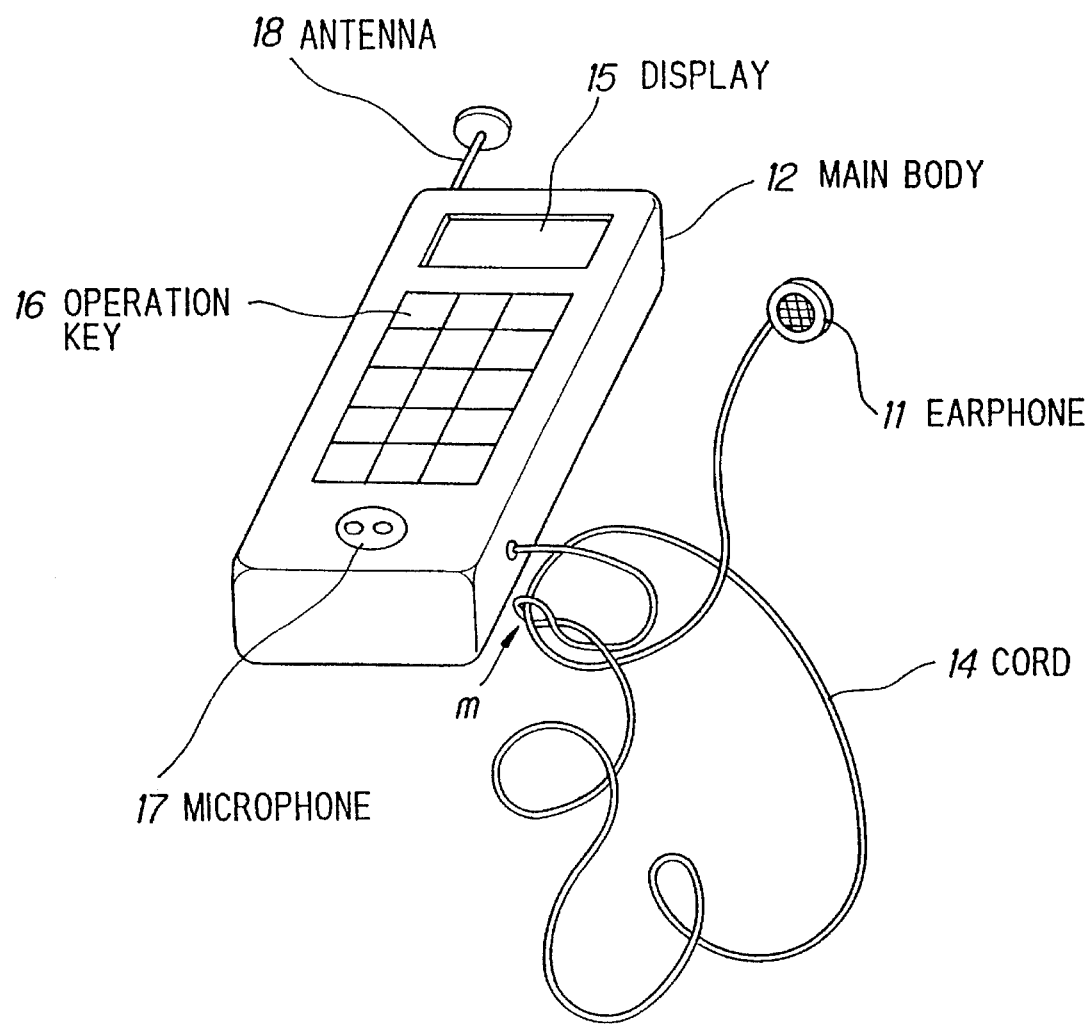
FIG. 2 is a perspective view showing a second conventional portable telephone set.

FIG. 2 shows the second conventional portable telephone set of a cellular mobile type telephone set which comprises a main body 12 having an earphone 11 connected thereto by an earphone cord 14. The main body 12 is provided with a display (LCD) 15 for displaying input dial numbers, a connection state of a radio transmission line, etc., operation keys 16 for dialing a telephone number, selecting one of functions, etc., a microphone 17 for supplying a radio circuit therein with voice information of a user, and a whip antenna 18 to be pulled out of the main body 12 and contained thereinto.

In accordance with the use of the earphone 11, a distance between a speaker and a microphone is not necessary to be considered in designing a portable telephone set. Therefore, the size can be small.

In such a portable telephone set using an earphone, the manipulation of an earphone and an earphone cord must be taken into consideration, because the earphone cord 14 is tangled as shown in FIG. 2 by the reference letter "m".

On the other hand, some examples are proposed to improve the manipulation of a cord for an earphone or a handset in a telephone set. One of examples is disclosed in the Japanese Patent Kokai No. 64-17544, wherein a winder for winding a cord connecting a handset to a main body is provided to suppress the tangling of the cord. Another example is disclosed in the Japanese Utility Model Kokai No. 1-88547, wherein an earphone and an earphone cord are contained in a containing portion provided in a handset of a telephone set, when the earphone is not used, but the handset is used for a speaker and a microphone. Further, the Japanese Utility Model Kokai No. 1-65544 discloses a telephone set in which a handset for a microphone and a speaker is connected to a main body by a cord, and the cord is pulled into the main body by a winder provided in the main body, when the handset is hooked on the main body in the non-communication state.

Even in the above examples, the tangling of a cord is not avoided completely, because the curling behavior is accumulated along the cord in accordance with the repetition of, for instance, pulling the cord out of a cord container and winding the cord on a bobbin or pulley of a winder.

Next, a portable telephone set with an earphone in the first preferred embodiment will be explained in FIG. 3, wherein the telephone set comprises a main body 12 and an earphone 11 connected to the main body 12 by a flat cord 14. The main body 12 is provided with a display (LCD) 15 for displaying an input dial number, a connection state of a radio transmission line, etc., operation keys 16 for dialing a telephone number, selecting one of functions, etc., a microphone 17, and a whip antenna 18 extendable out of the main body 12 and pushed thereinto.

In the portable telephone set, the flat cord 14 is connected to a sound (voice) output circuit (not shown) in the main body 12, and has a structure comprising a pair of conductors each composed of soft copper stranded wires, insulations for insulating the conductors, a branded steel shield layer covering the insulations, and a sheath provided on the outer surface of the shield layer, wherein the sheath is of a hard resin material such as polyethylene, polyvinyl-chloride, etc., so that a self-flat shape recovering property is generated in the flat cord 14.

In a specified design, the flat cord 14 is 0.5 mm in thickness and 4 mm in width, and the hardness of the flat cord 14 is adjusted, such that the earphone 14 is not taken off an ear of a user, even if the main body 12 is unintentionally moved.

In operation, the earphone 11 is put into an ear shell of the user's ear, while the main body 12 is held by a hand of the user. Simultaneously, the whip antenna 18 is pulled to be extended from the main body 12. Then, the operation keys 16 are pushed to dial a telephone number and select some functions, and th dialed telephone number, the selected functions, etc. are displayed on the display 15. Thus, a telephone communication starts with a callee designed by the telephone number. In such a communication state, the tangling of the flat cord 14 does not occur, because of the flat configuration and the appropriate hardness of the flat cord 14.

Therefore, the portable telephone set may be easily contained into a pocket of a jacket, etc. of the user without any distangling manipulation, when the telephone communication finishes. On the other hand, the portable telephone set is easily taken out of the pocket, in which no tangling of the flat cord 14 occurs, when the user starts preparing a telephone communication.

In the first preferred embodiment, the earphone 11 may be connected to the main body 12 by using a plug provided at the end of the flat cord 14, wherein the main body 12 is provided with a receptacle to be connected to the plug.

Figure 3:
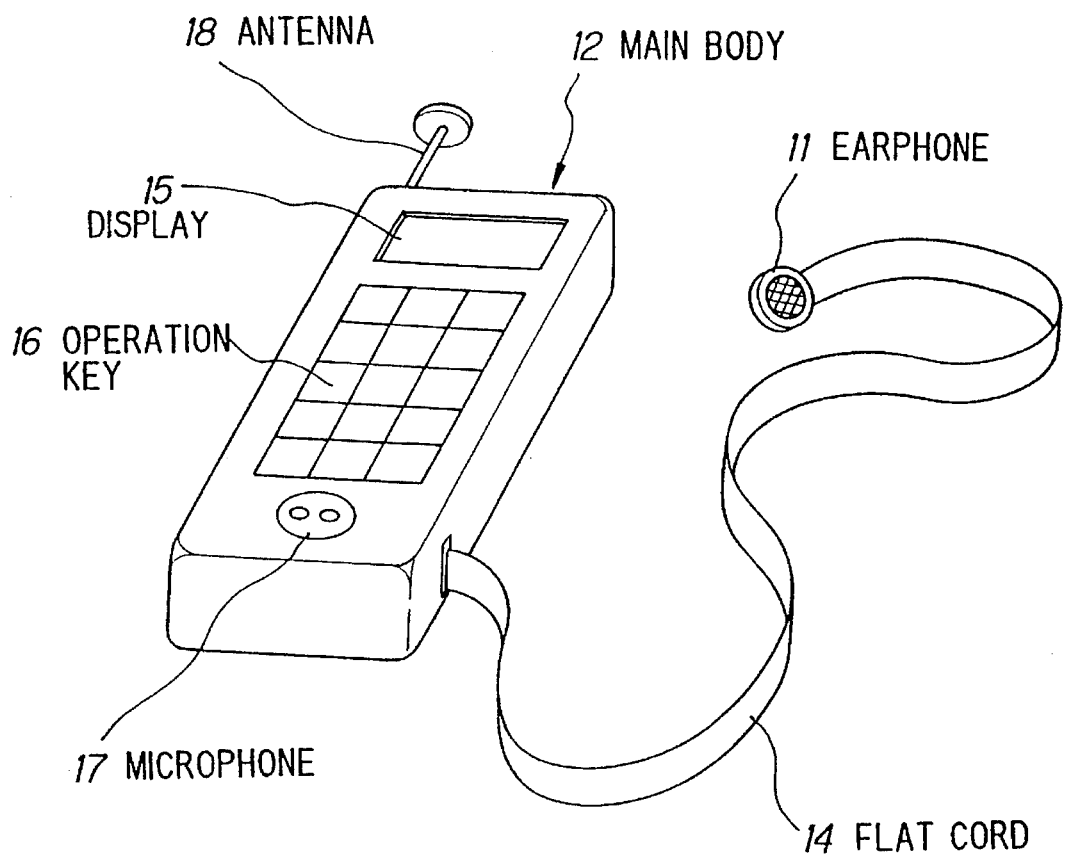
FIG. 3 is a perspective view showing a portable telephone set with an earphone in a first preferred embodiment according to the invention.
Figure 4:
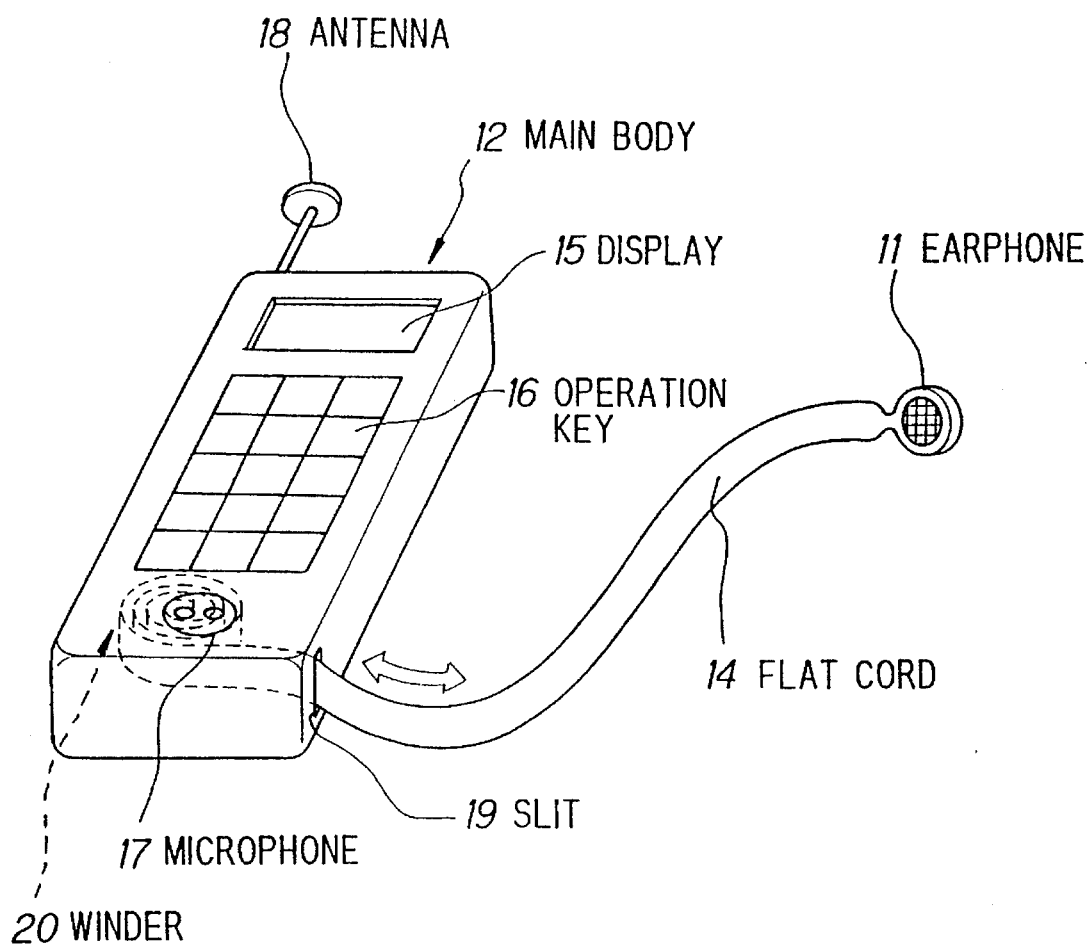
FIG. 4 is a perspective view showing a portable telephone set with an earphone in a second preferred embodiment according to the invention.

FIG. 4 shows a portable telephone set with an earphone in the second preferred embodiment, wherein like parts are indicated by like reference numerals as used in FIG. 3.

In the second preferred embodiment, the flat cord 14 having the earphone 11 is pulled via a slit 19 from the main body 12, in which a winder 20 is provided to wind the flat cord 14 thereon. The winder 20 is a well known type used in, for instance, a cleaner, and comprises a reel, a coil spring, etc.

In the second preferred embodiment, a predetermined length of the flat cord 14 is kept to be available outside the main body 12, when the flat cord 14 is pulled to be stopped from the main body by the predetermined length. On the other hand, the flat cord 14 is pulled into the main body 12 by th reel of the winder 20, when the flat cord 14 is released by the hand of the user after it is pulled from the main body 12 by a short length. The flat cord may be pulled into the main body 12 automatically by pushing a button, by which a breaking spring is released, so that the reel of the winder 20 is actuated to wind the flat cord 14. This winding mechanism is popular to be used in a cleaner.

Figure 5:
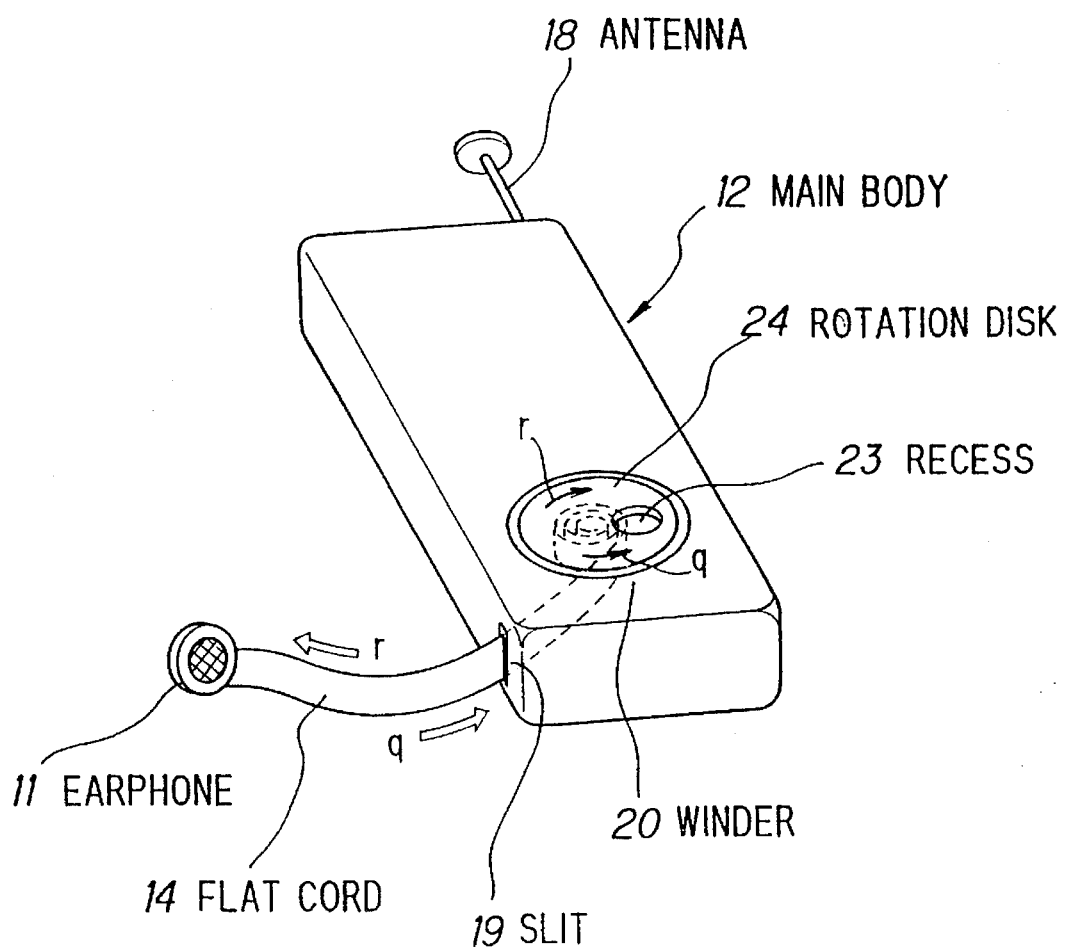
FIG. 5 is a perspective view showing a portable telephone set with an earphone in a third preferred embodiment according to the invention.

FIG. 5 shows a portable telephone set with an earphone in the third preferred embodiment, wherein like parts are indicated by like reference numerals as used in FIGS. 3 and 4.

In the third preferred embodiment, a rotation disk 24 formed with a recess 23 to be pressed by a finger of a user is provided on the lack plane of the main body 12 to rotate the reel of the winder 20.

In operation, the rotation disk 24 is rotated in the arrow direction of "r" by the finger pressing the recess 23. Consequently, the flat cord 14 having the earphone 11 is extended in the arrow direction of "r" via the slit 19 out of the main body 12. On the other hand, the rotation disk 24 is rotated in the arrow direction of "q" by the finger pressing the recess 23, so that the flat cord 14 is moved in the arrow direction of "q" to be wound on the reel of the winder 20.

Figure 6:
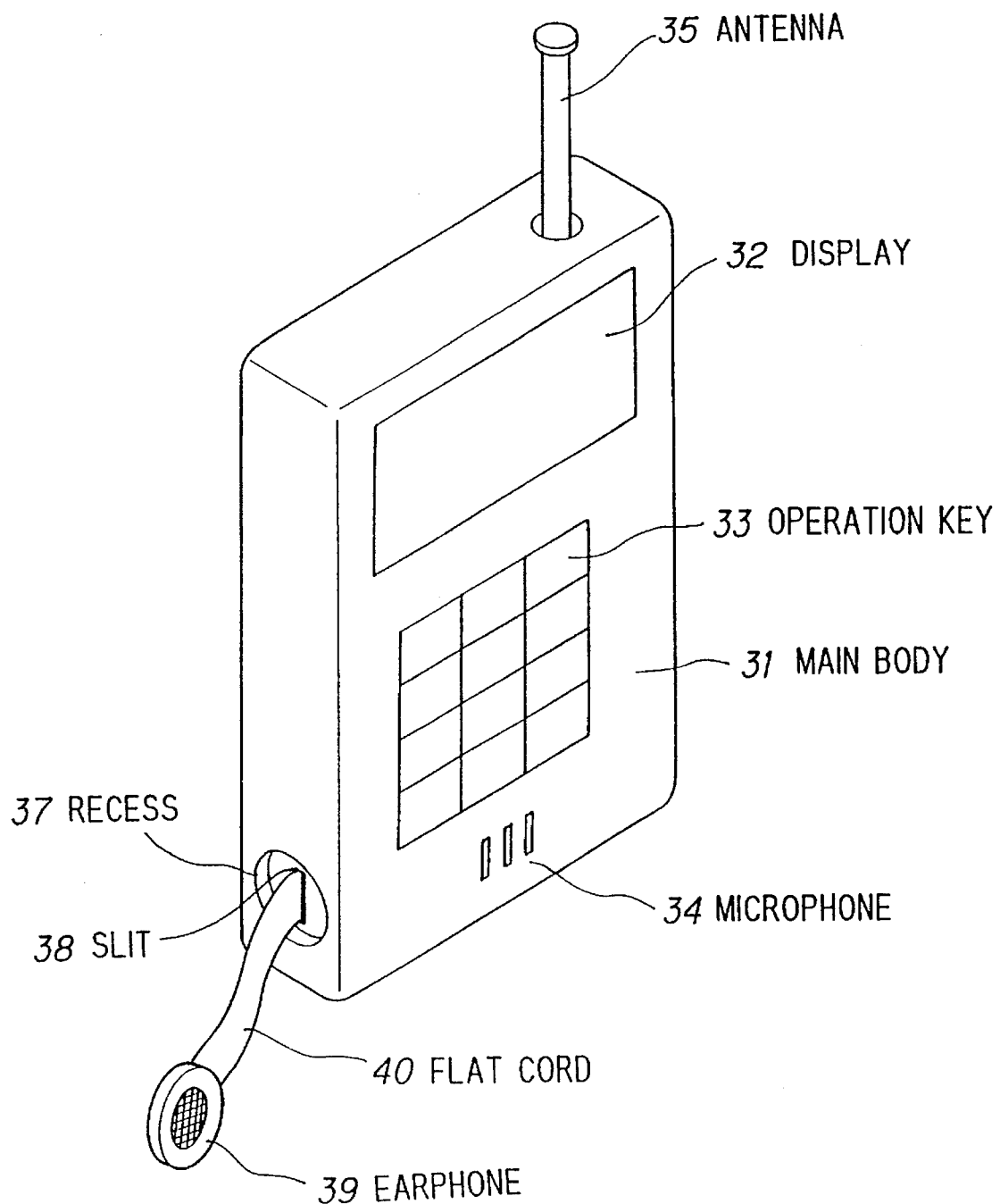
FIG. 6 is a perspective view showing a portable telephone set with an earphone in a fourth preferred embodiment according to the invention.
Figure 7:
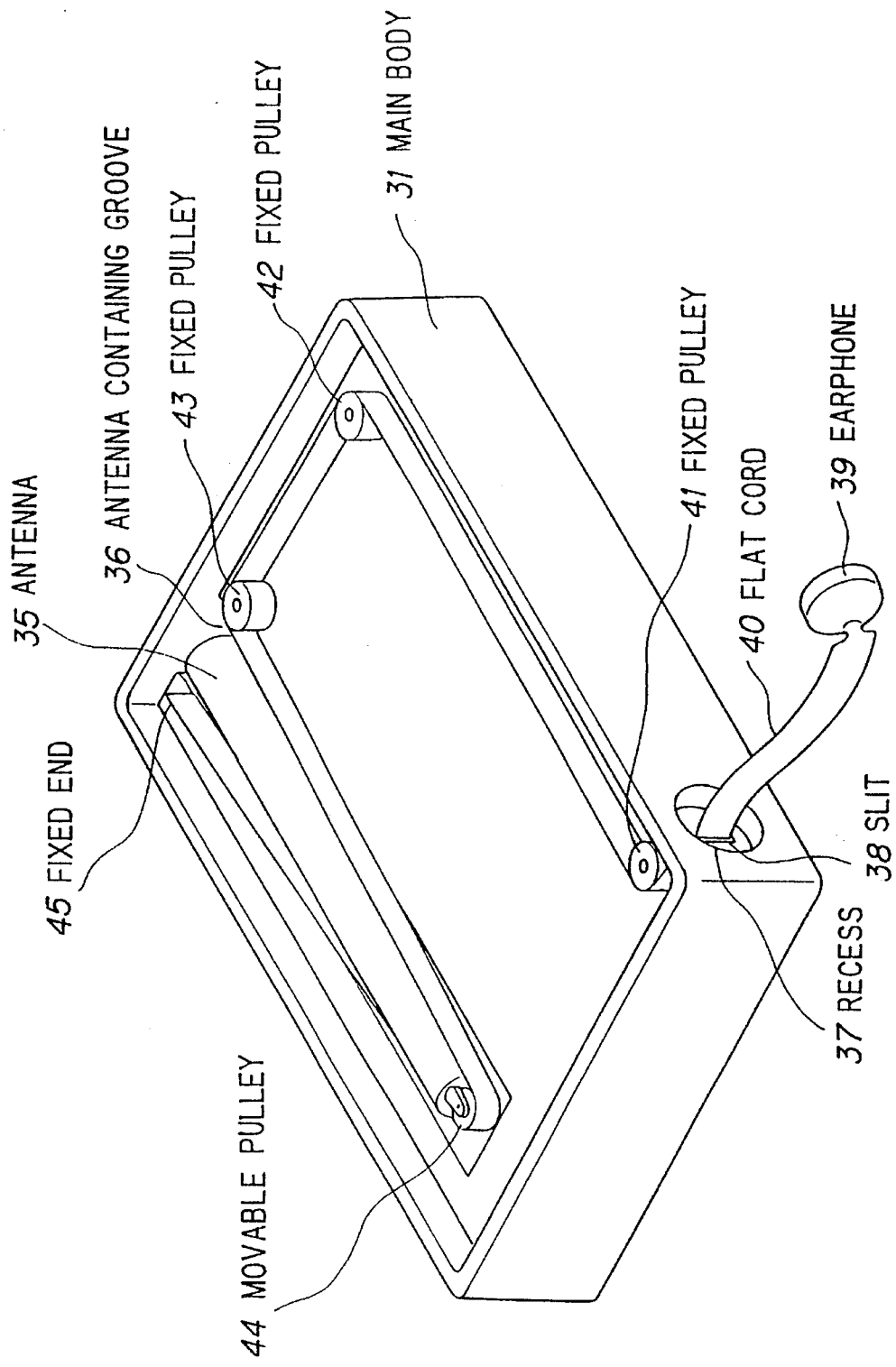
FIG. 7 is a perspective view showing a cord container of the portable telephone set with an earphone in the fourth preferred embodiment.

FIGS. 6 and 7 show a portable telephone set with an earphone in the fourth preferred embodiment according to the invention. The portable telephone set comprises a main body 31 which is provided with a display 32, operation keys 33, a microphone 34, and a whip antenna 35. The main body 31 is further provided with a recess 37 on a side plane and a slit 38 on the bottom of the recess 37. In the main body 31, fixed pulleys 41, 42 and 43 are provided to suspend a flat cord 40 having an earphone 39 at one end and a fixed end 45 connected to a sound (voice) output circuit (not shown) in cooperation with a movable pulley 44 provided on the bottom end of the antenna 35 which is seated inside an antenna containing groove 36, as shown in FIG. 7. The recess 37 is designed in diameter to receive the earphone 39.

In operation, the flat cord 40 is pulled by a hand of a user, so that a tension of the flat cord 40 is increased to raise the movable pulley 44, thereby extending the antenna 35 out of the main body 31, as shown in FIG. 8A. The same result is obtained, when the antenna 35 is pulled out of the main body 31, so that the flat cord 35 takes a straight posture across the fixed end 45 and the fixed pulley 42.

On the other hand, the antenna 35 is pushed into the antenna containing groove 36, so that the movable pulley 44 is lowered, as shown in FIG. 8B. Consequently, the flat cord 40 is totally contained in the main body 31, and the earphone 39 is held in the recess 37. The same result is obtained, when the flat cord 40 having the earphone 39 is pushed via the slit 38 into the main body 31, so that the movable pulley 44 is forcedly lowered.

Figure 9:
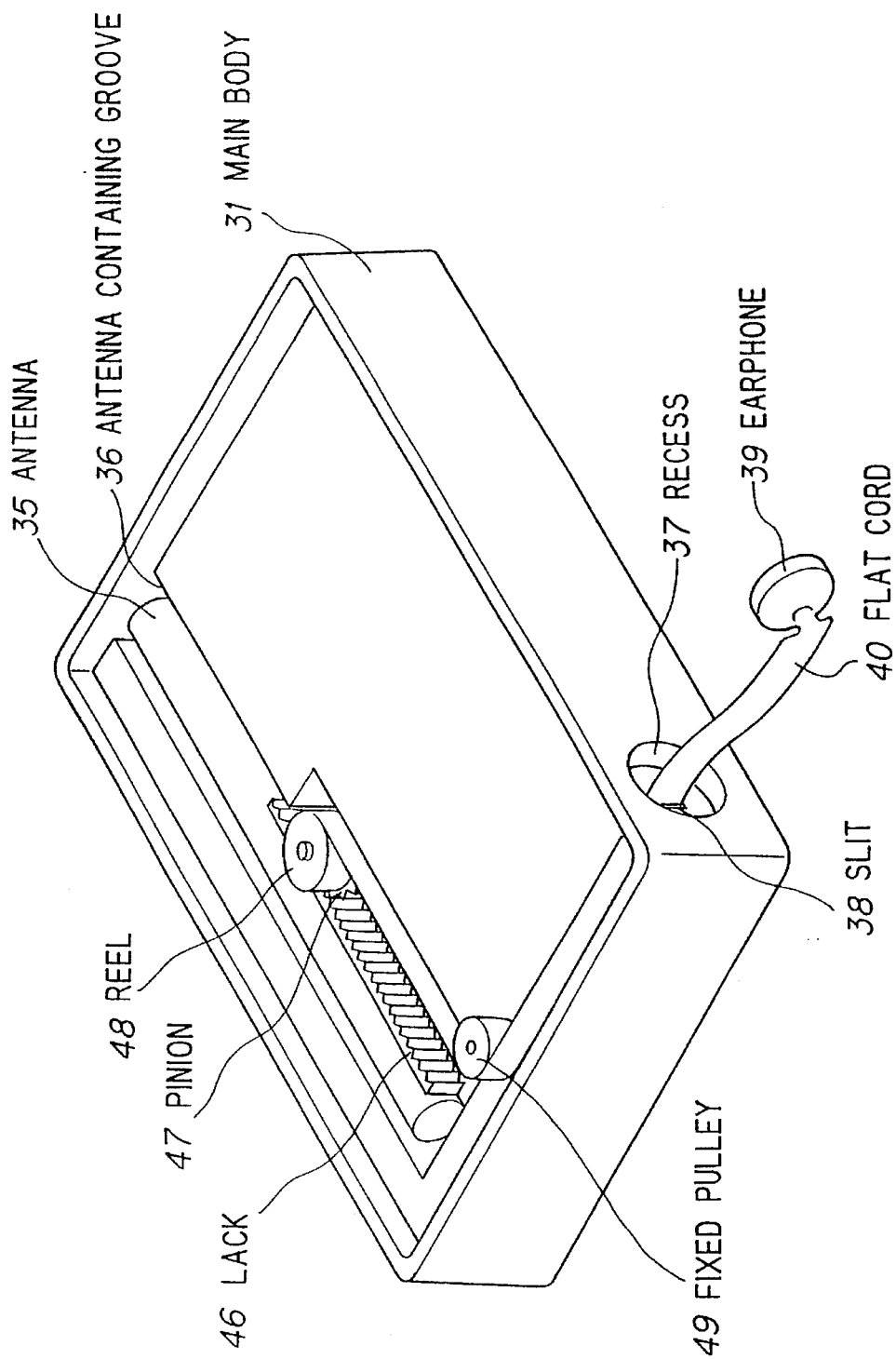
FIG. 9 is a perspective view showing a portable telephone set with an earphone in a fifth preferred embodiment according to the invention.

FIG. 9 shows a portable telephone set with an earphone in the fifth preferred embodiment, wherein like are indicated by like reference numerals as used in FIGS. 6, 7, 8A and 8B.

In the fifth preferred embodiment, the flat cord 40 is connected at one end to the earphone 39, and is wound on a reel 48 to be suspended by a fixed pulley 49. As a matter of course, the other end of the flat cord 40 is connected to a sound (voice) output circuit (not shown) in the main body 31. The reel 48 is rotated concentrically with a pinion 47 to be engaged with a rack 46 provided on a lower half length of the antenna 35.

In operation, the antenna 35 is pulled out of the main body 31, so that the pinion 47 and the reel 48 are rotated in the clockwise direction. As a result, the flat cord 40 is taken off the reel 48 to push the flat cord 40 into the outside of the main body 31 by a predetermined length, as shown in FIG. 10A.

The same result is obtained, when the flat cord 40 is pulled out of the main body 31, so that the antenna 35 is raised.

On the other hand, the antenna 35 is pushed into the antenna containing groove 36 of the main body 31, so that the pinion 47 and the reel 48 are rotated in the counter-clockwise direction to wind the flat cord 40 on the reel 48, as shown in FIG. 10B. Consequently, the flat cord 40 is contained in main body 31, and the earphone 39 is held in the recess 37. The same result is obtained, when the flat cord 40 is pushed via the slit 38 into the main body 31, so that the reel 48 and the pinion 47 are rotated in the counter-clockwise direction to lower the antenna 35.

Although the invention has been described with respect to specific embodiments for complete and clear disclosure, the appended claims are not to be thus limited but are to be construed as embodying all modifications and alternative constructions that may be occur to one skilled in the art which fairly fall within the basic teaching here is set forth.

What is claimed is:

1. A portable telephone set with an earphone, comprising:
    a main body containing telephone communication circuit including a sound generating circuit therein and having operation keys, and a microphone thereon;
    an antenna for receiving and transmitting telephone communication signals;
    an earphone cord for connecting said earphone to said sound generating circuit, said earphone cord being a flat cord; and
    means for retracting said flat cord into said main body and for extracting said flat cord from said main body,
    wherein said antenna is vertically movable to be extended out of said main body in an operational state and to be contained in said main body in a non-operational state,
    said retracting means for allowing said flat cord to be pulled out of said main body in said operational state and for retracting said flat cord so as to be contained in said main body in said non-operational state, and
    said means for retracting including means for correlating movements between said antenna and said flat cord,
    wherein when one of said antenna and said flat cord is extended out of said main body, a remaining one of said antenna and said flat cord is extended out of said main body by said correlating means, and when said one is contained in said main body, said remaining one is contained in said main body by said correlating means.

2. A portable telephone set with an earphone, according to claim 1, wherein:
    said flat cord is shaped in cross-section to have a ratio of ⅛ as to thickness relative to width.

3. A portable telephone set with an earphone, according to claim 2, wherein:
    said correlating means comprises a movable pulley vertically moving responsive to moving of said antenna; and
    a pulley fixed to said main body,
    a first end of said flat cord being fixed to said main body, a second end of said flat cord being connected to said earphone, and said flat cord being suspended by said movable pulley and said fixed pulley.

4. A portable telephone set with an earphone, according to claim 2, wherein:
    said correlating means comprises a reel rotating responsive to moving of said antenna; and
    a pulley fixed to said main body,
    a first end of said flat cord being wound on said reel, a second end of said flat cord being connected to said earphone, and said flat cord being suspended between said first and second ends by said fixed pulley.

5. A portable telephone set with an earphone, comprising:
    a main body containing telephone communication circuit including a sound generating circuit therein and having operation keys, and a microphone thereon;
    an antenna for receiving and transmitting telephone communication signals, said antenna being retractable into and extractable out of said main body;
    an earphone cord for connecting said earphone to said sound generating circuit; and
    means for retracting and for extracting said earphone cord into and out of said main body,
    wherein said earphone cord comprises a flat cord, and
    wherein said antenna is vertically movable to be extractable from said main body in an operational state and retractable in said main body in a non-operational state,
    said retracting means for allowing said flat cord to be extracted from said main body in said operational state and for retracting said flat cord so as to be contained in said main body in said non-operational state,
    said means for retracting including means for correlating movements between said antenna and said flat cord such that said retracting means retracts and extracts said earphone cord into and out of said main body in relation to an amount of retraction and extraction of said antenna.

6. A portable telephone set with an earphone, comprising:
    a main body containing telephone communication circuit including a sound generating circuit therein and having operation keys, and a microphone thereon;
    an antenna for receiving and transmitting telephone communication signals, said antenna being retractable into and extractable out of said main body;

an earphone cord for connecting said earphone to said sound generating circuit; and means for retracting and for extracting said earphone cord into and out of said main body, wherein said earphone cord comprises a flat cord, and wherein when one of said antenna and said flat cord is extracted out of said main body, a remaining one of said antenna and said flat cord is extracted out of said main body by said retracting means, and when said one is retracted in said main body, said remaining one is retracted in said main body by said retracting means.

7. A portable telephone set with an earphone, comprising:

a main body containing telephone communication circuit including a sound generating circuit therein and having operation keys, and a microphone thereon;

an antenna for receiving and transmitting telephone communication signals, said antenna being retractable into and extractable out of said main body;

an earphone cord for connecting said earphone to said sound generating circuit; and means for retracting and for extracting said earphone cord into and out of said main body, wherein said earphone cord comprises a flat cord, and wherein said retracting means comprises:

a movable pulley vertically moving responsive to moving of said antenna; and a pulley fixed to said main body, a first end of said flat cord being fixed to said main body, a second end of said flat cord being connected to said earphone, and said flat cord being suspended by said movable pulley and said fixed pulley.

8. A portable telephone set with an earphone, comprising:

a main body containing telephone communication circuit including a sound generating circuit therein and having operation keys, and a microphone thereon;

an antenna for receiving and transmitting telephone communication signals, said antenna being retractable into and extractable out of said main body;

an earphone cord for connecting said earphone to said sound generating circuit; and means for retracting and for extracting said earphone cord into and out of said main body, wherein said earphone cord comprises a flat cord, and wherein:

said retracting means comprises a reel rotating responsive to moving of said antenna; and a pulley fixed to said main body, a first end of said flat cord being wound on said reel, a second end of said flat cord being connected to said earphone, and said flat cord being suspended between said first and second ends by said fixed pulley.

* * * * *